Figure 1:
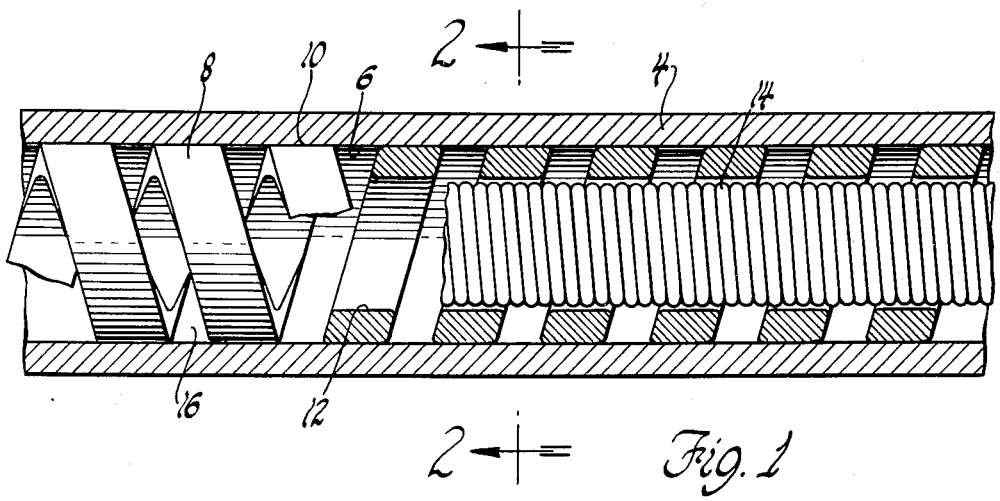

March 1, 1966  A. S. MATZ  3,237,477

DEVICE FOR TRANSMITTING MECHANICAL MOTION

Filed June 28, 1963

INVENTOR.
Allen S. Matz
BY
Barnard, McGlynn & Reising
ATTORNEYS

United States Patent Office 3,237,477
Patented Mar. 1, 1966

3,237,477
DEVICE FOR TRANSMITTING MECHANICAL MOTION
Allen S. Matz, Cornwells Heights, Pa., assignor to Teleflex Incorporated, North Wales, Pa., a corporation of Delaware
Filed June 28, 1963, Ser. No. 291,353
2 Claims. (Cl. 74—501)

This invention relates to a device for transmitting mechanical motion and to a method for making same. More particularly, the subject matter of the invention is an improved mechanical motion transmitter of the general type comprising a tubular conduit with a wire or other core element extending therethrough which is adapted for to and fro and/or rotary motion within the conduit.

Devices of the type described are commonly used in various types of mechanical controls, for example, to transmit the push-pull or rotary movement of a control lever or button in the operator's compartment of a vehicle to the vehicle engine or other mechanism being controlled. One of the characteristics sought to be achieved in controls of this type is that of high motion transmitting efficiency or, in other words, minimum binding or frictional contact between the interior of the conduit and the movable core element. Good efficiency is difficult to attain since in practically all installations of such controls it is required that the conduit be bent sometimes through relatively sharp angles thereby greatly increasing the tendency toward excessive binding or frictional contact between the core and the conduit. At the present state of the art, there are numerous composite conduit constructions which have been proposed and many of which are in common use for assuring against excessive frictional losses in core movement. However, such structures are relatively expensive. Most of the expense derives from the difficulty in providing the interior of the conduit with a smooth controlled low friction surface along with means for assuring against any significant reduction of the conduit diameter at the locations where it is required to be bent for installation. It is extremely difficult and commensurately expensive, for example, to line the interior of a metal conduit with a smooth lubricative plastic tube and even with such accomplished there is no provision for preventing conduit collapse when it is bent. The same is true as regards coating the interior of a metal tube with a plastic or other lubricative finish. Control and uniformity of the coating, essential to the attainment of low frictional characteristics, is prohibitively expensive if not impossible particularly for long lengths of conduit. The most successful solution to these problems to date involves forming the metal conduit around a lubricative plastic inner tube member by helically wrapping a plurality of wires on a long lead, around the plastic tube and then in turn covering the conduit formed by the helically wrapped wires with a protective plastic sheath. Such conduit is excellent in all respects; however, it is quite expensive to manufacture.

It is a principal object of the present invention to provide a mechanical motion transmitting device of the type described which is relatively inexpensive and yet which provides excellent motion transmitting efficiency.

Another and attendant object of the invention is the provision of an improved method for manufacturing conduit for motion transmitting devices of the type described.

Another and more specific object of the invention is the provision of a conduit for control mechanisms of the type described which is of relatively simple composite construction which is economical of manufacture and which provides a controlled low friction interior conduit surface along with means for assuring a relatively constant conduit internal diameter even when the conduit is required to be bent for installation purposes.

Briefly, these objects are accomplished in accordance with the invention by a conduit which comprises a tubular member with a monocoil extending therethrough, the monocoil having an exterior surface in fixed pressed engagement with the interior surface of the tubular member and a smooth low friction internal surface. Hence, the interior surface of the monocoil provides the low friction bearing surface for engagement by the movable core element. Also since the monocoil is in fixed pressed engagement with the tubular member, it assures against collapse when the conduit is bent. Further in accordance with the invention, such conduit can be easily and inexpensively manufactured by first polishing or otherwise surface finishing one side of a flat elongate relatively narrow metal strip, coiling the strip, as on a mandrel, with the finished surface on the interior of the coil, inserting the coil into the tubular member the tubular member being of sufficiently greater diameter to allow easy insertion, and then applying external pressure to the tubular member, as by swaging, to thereby press fit the coil and tubular member in fixed pressed engagement with each other. It will be manifest that by way of such method and construction, a smooth, controlled low friction bearing surface for the movable coil element is provided on the interior of the conduit with minimum manufacturing difficulties and therefore at low cost, the necessity for surface finishing the interior of the tubular member itself being completely obviated.

Figure 2:
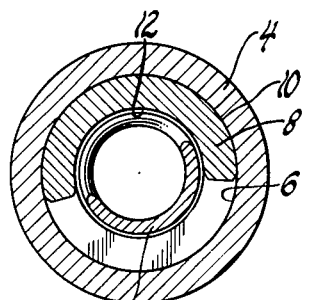

The above and other objects, features and advantages of the invention will appear more clearly from the following detailed description of a preferred embodiment thereo, made with reference to the appended drawings in which:

FIGURE 1 is a side view, partially in section and with parts broken away of a mechanical motion transmitting device constructed in accordance with the invention; and FIGURE 2 is a view taken on the line 2—2 of FIGURE 1.

Referring now to the drawings, the control device shown comprises a metal tubular member 4 having a cylindrical interior surface 6 and a metal monocoil 8 of generally rectangular section having its exterior cylindrical surface 10 in fixed pressed engagement with the interior surface 6 of the tubular member. The interior cylindrical surface 12 of the monocoil is finished as by polishing, coating or the like to provide the precise low frictional and wear resistant characteristics desired. Extending through the conduit formed by the monocoil in combination with the tubular member 4 is a movable core element 14 which is of slightly lesser diameter than the internal diameter of the coil. In the particular embodiment shown, the core element is formed of wire wrapped on a short lead; however, it will be understood that various other types of core elements such as a monofilament wire or wire wrapped on a long lead can be used as desired. Where a coiled core construction is used, it should preferably be wrapped in a direction opposite to that of the monocoil 8 as shown in FIGURE 1.

It will be noted that the loops or turns of the monocoil are spaced from each other thereby providing a generally axially extending helical crevice 16. Such spacing between the coil loops allows the conduit to be easily bent to curved configuration as required for installation purposes, the coil preventing any collapse of the conduit in the curved sections. Hence, there is assurance of a relatively constant internal diameter which is essential to prevent binding between the core and the conduit in operation. Further the helical crevice 16 provides an excellent reservoir for grease or oil lubricant in the conduit and helps to prevent such lubricant from being worked by the core movement to one end or the other of the conduit as is a common problem with conventional conduit construction. The helical crevice also provides a path for pumping fresh lubricant through the conduit or, where cooling is required, for pumping coolant fluid through the conduit. Of course the monocoil further serves to strengthen the conduit, particularly against rupture from high radial loads.

To manufacture the device shown in FIGURES 1 and 2, a narrow metal strip is first formed as by drawing operation or by flattening a metal wire and one side of the strip is then polished or otherwise surface finished to provide the precise low frictional surface characteristics desired. For example, the surface can be coated with a low friction material or it can be chemically or mechanically polished. If a coating or chemical treatment is used it may be advantageous, for simplicity of manufacture, to coat or surface treat all sides of the strip rather than just the one surface. After the surface finishing operation is completed, the metal strip is coiled, as by winding on a mandrel, to provide the coil 8 shown. Such coil is then inserted into a tubular member, the internal diameter of the tubular member being somewhat greater than the external diameter of the coil to allow easy insertion. With the coil so inserted, the tubular member is then swaged such as by drawing through a die to thereby reduce its diameter and cause a tight pressed fit with the coil as shown in the drawings. After securing the desired end fittings (not shown) the movable coil element can then be inserted to complete the manufacture. Hence, there is provided a conduit with a controlled interior surface finish but without the problems normally attendant to finishing the interior surface of a tube.

It will be understood that while the invention has been described specifically with reference to a preferred embodiment thereof, various changes and modifications may be made all within the full and intended scope of the claims which follow.

I claim:
1. A conduit comprising an integral metal tubular member having a cylindrical interior surface and a metal monocoil extending through said tubular member, said monocoil having generally cylindrical interior and exterior surfaces, the exterior surface of said monocoil being in pressed fixed engagement with the interior surface of said tubular member and the internal surface of said monocoil being finished to provide a low friction bearing surface, adjacent loops of said coil being spaced to thereby provide an axially extending helical crevice in the interior of said conduit.

2. A motion transmitting device comprising a conduit, said conduit including a metal tubular member with an integral metal monocoil extending therethrough and coextensive therewith, said monocoil having an exterior surface in fixed pressed engagement with the interior surface of said tubular member and a finished low friction internal surface, and an elongate movable core element extending through said conduit in slidable relationship with said finished surface of said monocoil.

References Cited by the Examiner
UNITED STATES PATENTS

| | | | |
|---|---|---|---|
| 399,244 | 3/1887 | Converse | 138—140 |
| 570,256 | 10/1896 | Lavens | 138—140 X |
| 1,295,329 | 2/1919 | Kennedy | 138—140 X |
| 1,678,335 | 7/1928 | Gaston | 64—2 |
| 1,905,664 | 4/1933 | Weatherhead | 74—502 X |
| 1,912,658 | 6/1933 | Schulse | 64—2 |
| 1,995,421 | 3/1935 | Goldberg | 64—2 |
| 2,045,568 | 6/1936 | Burd | 64—3 |
| 2,146,412 | 2/1939 | Arens | 74—502 X |
| 2,279,671 | 4/1942 | Ford | 138—140 |
| 2,706,417 | 4/1955 | Waner | 74—501 |
| 2,821,092 | 1/1958 | Cordora et al. | 74—501 |
| 2,918,808 | 12/1959 | Botti | 64—4 |
| 3,009,484 | 11/1961 | Dollens | 138—140 |
| 3,015,969 | 1/1962 | Bratz | 64—2 X |

FOREIGN PATENTS

| | | |
|---|---|---|
| 5,453 | 1891 | Great Britain. |
| 10,181 | 1893 | Great Britain. |
| 586,764 | 12/1958 | Italy. |

BROUGHTON G. DURHAM, *Primary Examiner.*